US010640629B2

(12) United States Patent
Kim et al.

(10) Patent No.: US 10,640,629 B2
(45) Date of Patent: May 5, 2020

(54) AEROGEL-CONTAINING COMPOSITION AND INSULATION BLANKET PREPARED USING THE SAME

(71) Applicants: LG CHEM, LTD., Seoul (KR); INHA UNIVERSITY RESEARCH AND BUSINESS FOUNDATION, Incheon (KR)

(72) Inventors: Ye Hon Kim, Daejeon (KR); Hae Jin Hwang, Seoul (KR); Je Kyun Lee, Daejeon (KR); Kyoung Jin Lee, Gwangmyeong-si (KR)

(73) Assignees: LG CHEM, LTD., Seoul (KR); INHA UNIVERSITY RESEARCH AND BUSINESS, Incheon (KR)

( * ) Notice: Subject to any disclaimer, the term of this patent is extended or adjusted under 35 U.S.C. 154(b) by 0 days.

(21) Appl. No.: 15/547,692

(22) PCT Filed: Mar. 25, 2016

(86) PCT No.: PCT/KR2016/003035
§ 371 (c)(1),
(2) Date: Jul. 31, 2017

(87) PCT Pub. No.: WO2016/163670
PCT Pub. Date: Oct. 13, 2016

(65) Prior Publication Data
US 2018/0009969 A1    Jan. 11, 2018

(30) Foreign Application Priority Data

Apr. 7, 2015   (KR) ........................ 10-2015-0048964
Mar. 24, 2016  (KR) ........................ 10-2016-0035079

(51) Int. Cl.
C08J 9/14      (2006.01)
C01B 33/155    (2006.01)
(Continued)

(52) U.S. Cl.
CPC .............. *C08K 7/26* (2013.01); *C01B 33/159* (2013.01); *C01B 33/1585* (2013.01);
(Continued)

(58) Field of Classification Search
CPC ................ C08J 9/00; C08J 9/141; C08K 7/26
See application file for complete search history.

(56) References Cited

U.S. PATENT DOCUMENTS 4,082,841 A   4/1978   Pader
4,152,418 A   5/1979   Pader
(Continued)

FOREIGN PATENT DOCUMENTS

CN   1309468 C      4/2007
CN   102701700 A   10/2012
(Continued)

OTHER PUBLICATIONS

Wiehn et al., Industrial & Engineering Chemistry Research, 2013, 52, p. 18379-18385. (Year: 2013).*

*Primary Examiner* — Kara B Boyle
(74) *Attorney, Agent, or Firm* — Dentons US LLP (57) ABSTRACT

The present disclosure provides an aerogel-containing composition including an aerogel, a water-soluble binder, a foaming agent, and a mixture of water and a polar organic solvent as a solvent, and an insulation blanket prepared using the same. In the aerogel-containing composition, the aerogel is uniformly dispersed in the composition, and when preparing a blanket, an insulation blanket having low thermal conductivity and flexibility of low density is prepared without concern of shrinkage of the substrate for a blanket and detachment of the aerogel during a drying process.

9 Claims, 4 Drawing Sheets

(51) Int. Cl.
    *C08K 7/26*            (2006.01)
    *C08J 3/075*           (2006.01)
    *C01B 33/158*         (2006.01)
    *C01B 33/159*        (2006.01)
    *C08L 23/08*           (2006.01)
    *C08L 31/06*           (2006.01)
    *D06M 11/77*          (2006.01)
    *C09D 7/61*            (2018.01)
    *C09D 131/04*         (2006.01)
    *D06M 15/333*        (2006.01)

(52) U.S. Cl.
    CPC ................ *C08J 3/075* (2013.01); *C08J 9/14* (2013.01); *C08J 9/141* (2013.01); *C08L 23/08* (2013.01); *C08L 31/06* (2013.01); *C09D 7/61* (2018.01); *C09D 131/04* (2013.01); *D06M 11/77* (2013.01); *D06M 15/333* (2013.01); *C08J 2203/14* (2013.01); *C08J 2205/026* (2013.01); *C08J 2331/04* (2013.01); *D06M 2400/02* (2013.01)

(56) References Cited

U.S. PATENT DOCUMENTS

| | | | |
|---|---|---|---|
| 4,154,815 A | 5/1979 | Pader | |
| 4,435,380 A | 3/1984 | Pader | |
| 5,447,962 A * | 9/1995 | Ajioka | C08J 9/06 521/182 |
| 5,683,772 A * | 11/1997 | Andersen | B65D 65/466 206/524.3 |
| 2003/0215640 A1 * | 11/2003 | Ackerman | B01J 13/0091 428/405 |
| 2010/0204800 A1 | 8/2010 | Thomas et al. | |
| 2011/0017340 A1 * | 1/2011 | Mirossay | C08J 9/0066 138/149 |
| 2012/0326071 A1 * | 12/2012 | Pasquero | C08J 9/0066 252/62 |

FOREIGN PATENT DOCUMENTS

| | | | | |
|---|---|---|---|---|
| EP | 0126523 | A2 | 11/1984 | |
| KR | 10-0666110 | B1 | 1/2007 | |
| KR | 10-2008-0101264 | A | 11/2008 | |
| KR | 10-2010-0010350 | A | 2/2010 | |
| KR | 10-2012-0043329 | A | 5/2012 | |
| KR | 10-2013-0039028 | | * 4/2013 | ............ C09D 7/12 |
| KR | 10-2013-0122797 | A | 11/2013 | |
| KR | 10-2013-0124960 | A | 11/2013 | |
| KR | 10-1454233 | B1 | 10/2014 | |
| WO | WO-9936479 | A1 * | 7/1999 | .......... C01B 33/159 |
| WO | 2009/085191 | A2 | 7/2009 | |

* cited by examiner

AEROGEL-CONTAINING COMPOSITION AND INSULATION BLANKET PREPARED USING THE SAME

FIELD OF THE INVENTION

This application is a National Stage Entry of International Application No. PCT/KR2016/003035, filed Mar. 25, 2016, and claims the benefit of and priority to Korean Application No. 10-2015-0048964, filed on Apr. 7, 2015, and Korean Application No. 10-2016-0035079, filed on Mar. 24, 2016, all of which are hereby incorporated by reference in their entirety for all purposes as if fully set forth herein.

The present disclosure relates to an aerogel-containing composition useful in preparing an insulation blanket having flexibility of low density together with low thermal conductivity, and an insulation blanket prepared using the same.

DESCRIPTION OF THE RELATED ART

With recent modernization of industrial technologies, interests on aerogels having an excellent insulation property have been increasing.

Aerogels are a highly porous material formed with nanoparticles, and have high porosity and specific surface area, and low thermal conductivity, and are expected to be used in various fields such as insulation materials, catalysts or layer insulation materials of a semiconductor circuit. Although a pace of commercialization is very low due to a complicated preparing process, low mechanical strength and the like, and early applied products have been on the market as a result of consistent researches and a pace of market expansion including insulation materials has gradually increased.

Specifically, among various aerogels, silica aerogels have been commercialized in forms such as aerogel blankets or aerogel sheets by being composited with fibers in a powder form. These aerogel blankets or sheets have flexibility, and may be bent, folded or cut in any size or form.

However, aerogel powders are weakly attached to a fiber mostly, and therefore, are readily detached during operation, and the degree of environmental contamination is serious due to heavy powder flying. In addition, density and mechanical strength of the aerogel itself are very low, and there are difficulties in commercializing the aerogel in the form of sheets or boards.

DISCLOSURE OF THE INVENTION

Technical Problem

The present disclosure is directed to providing an aerogel-containing composition capable of preparing an insulation blanket having low thermal conductivity and flexibility of low density without concern of blanket substrate shrinkage and aerogel detachment during a drying process for blanket preparation by uniformly dispersing the aerogel in the composition.

The present disclosure is also directed to providing an insulation blanket prepared using the aerogel-containing composition.

Technical Solution

The present disclosure has been made in view of the above, and one embodiment of the present disclosure provides an aerogel-containing composition including an aerogel, a water-soluble binder, a foaming agent and a solvent, wherein the solvent includes water and a polar organic solvent.

Another embodiment of the present disclosure provides an insulation blanket prepared using the aerogel-containing composition.

Advantageous Effects

In an aerogel-containing composition according to the present disclosure, the aerogel is uniformly dispersed in the composition, and when preparing a blanket using the same, blanket substrate shrinkage is suppressed and aerogel detachment occurs less during a drying process. In addition, the prepared blanket has low thermal conductivity and flexibility of low density, and therefore, is useful as an insulation material.

In addition, when a blanket is prepared using the aerogel-containing composition, complicated processes such as freeze-drying or thermal bonding are not required, and therefore, a blanket may be prepared in a short period of time with low costs, which is useful in mass production of a blanket.

DESCRIPTION OF DRAWINGS

The following drawings attached to the present specification illustrate preferred embodiments of the present disclosure, and perform a role of further illuminating technological ideas of the present disclosure together with the contents of the disclosure described above, and therefore, the present disclosure is not to be interpreted to be limited to such descriptions provided in the drawings.

MODE FOR CARRYING OUT THE INVENTION

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which inventors may suitably define the concepts of terms in order to describe their own invention in the best possible way.

Blankets using existing aerogels are prepared by immersing a substrate for a blanket into a composition with the aerogel dispersed therein, and then drying the result. However, the aerogel is non-uniformly distributed in the composition due to low dispersibility, and as a result, the substrate for a blanket is shrunk during a drying process and the aerogel is detached when preparing a blanket using the same.

In view of the above, the present disclosure provides an aerogel-containing composition capable of preparing a blanket having flexibility of low density together with low thermal conductivity by, when preparing the composition including an aerogel, increasing aerogel dispersibility through using a mixture of water and a polar organic solvent as a solvent, enhancing adhesion between aerogel particles and adhesion between aerogel particles and a substrate textile through using a water-soluble binder, and maintaining the unique properties of a textile through suppressing a textile shrinkage phenomenon during a drying process by using a foaming agent.

Specifically, an aerogel-containing composition according to one embodiment of the present disclosure includes i) an aerogel, ii) a water-soluble binder, iii) a foaming agent and iv) a mixture of water and a polar organic solvent as a solvent. Hereinafter, each component will be described in detail.

i) Aerogel

In the aerogel-containing composition according to one embodiment of the present disclosure, the aerogel is a particulate porous structure including a plurality of micropores, and may have a microstructure forming a mesh-type cluster by the bindings of nano-sized first particles, specifically, first particles having an average particle diameter ($D_{50}$) of 30 nm or less and more specifically 10 nm to 20 nm, that is, a three-dimensional network structure.

In such a porous structure of the aerogel, an average size and density of the pores may be controlled through controlling conditions in the preparation process. Accordingly, the aerogel capable of being used in preparing the aerogel-containing composition according to one embodiment of the present disclosure may have porosity of 90% by volume or greater, and tap density of 0.04 $g/cm^3$ to 0.2 $g/cm^3$. In addition, the average pore diameter may be 20 nm or less or from 5 nm to 15 nm. Tap density of the aerogel may be measured using a tap density measuring instrument (TAP-2S, Logan Instruments Co.), and the pore diameter and the porosity may be measured as adsorbed/desorbed amounts of nitrogen depending on a partial pressure ($0.11<p/p_o<1$) using an ASAP 2010 instrument of Micrometrics.

The aerogel preferably has an average particle diameter or a specific surface area readily penetrable into the pores of a substrate for a blanket used when preparing an insulation blanket. Specifically, the aerogel may have a specific surface area of 700 $m^2/g$ or greater and an average particle diameter ($D_{50}$) of 5 μm to 80 μm. More specifically, the specific surface area may be from 700 $m^2/g$ to 1000 $m^2/g$ and the average particle diameter ($D_{50}$) may be from 10 μm to 20 μm. In the present disclosure, a specific surface area of the aerogel may be measured as adsorbed/desorbed amounts of nitrogen depending on a partial pressure ($0.11<p/p_o<1$) using an ASAP 2010 instrument of Micrometrics. In addition, the average particle diameter ($D_{50}$) may be defined as a particle diameter based on 50% in the particle diameter distribution, and herein, the average particle diameter of the aerogel may be measured using a laser diffraction method. More specifically, the aerogel is dispersed into a solvent and then introduced to a commercially available laser diffraction particle size measuring instrument (for example, Microtrac MT 3000), and after irradiating ultrasonic waves of approximately 28 kHz with an output of 60 W, the average particle diameter ($D_{50}$) based on 50% in the particle diameter distribution in the measuring instrument may be calculated.

Within the ranges of the tap density, the specific surface area, the particle size and the pore size, an enhanced insulation effect is obtained together with excellent solvent dispersibility, due to the volume occupied by the pores.

In addition, the aerogel preferably has lower thermal conductivity than a substrate for a blanket since an insulation effect is enhanced when preparing an insulation blanket. Accordingly, the aerogel capable of being used in preparing the aerogel-containing composition according to one embodiment of the present disclosure may specifically have thermal conductivity of 0.02 W/mK or less. In the present disclosure, thermal conductivity of the aerogel may be measured using a thermal conductivity measuring instrument.

In the aerogel capable of being used in preparing the aerogel-containing composition according to one embodiment of the present disclosure, the aerogel may be an organic aerogel such as resorcinol-formaldehyde or melamine-formaldehyde aerogel particles; or inorganic aerogels such as metal oxide aerogel particles, and more specifically, the aerogel may be an inorganic aerogel such as silica ($SiO_2$), alumina ($Al_2O_3$), titania ($TiO_2$) or carbon (C) aerogels, and any one or a mixture of two or more thereof may be used. Even more specifically, the aerogel may be a silica aerogel having low thermal conductivity.

In addition, the aerogel may exhibit hydrophobicity itself or may be surface hydrophobized.

Aerogels are normally prepared by preparing a wet gel from a silica precursor such as water glass or tetraethoxysilane (TEOS), and then removing a liquid component inside the wet gel without destroying the microstructure. Herein, the pores are filled with water in the wet gel. Accordingly, when the solvent is removed through a drying process thereafter, the liquid solvent evaporates to a gaseous state, and shrinkage and cracks occur on the pore structure due to high surface tension of water at a gas/liquid interface. As a result, the specific surface area decreases and the pore structure changes in a finally prepared silica aerogel. Therefore, in order to maintain a pore structure of the wet gel, water having relatively high surface tension needs to be replaced with an organic solvent having relatively low surface tension. A dried silica aerogel maintains low thermal conductivity immediately after drying, however, there is a disadvantage in that thermal conductivity gradually increases as a hydrophobic silanol group (Si—OH) present on the silica surface absorbs moisture in air. Accordingly, in order to maintain low thermal conductivity, the aerogel surface needs to have hydrophobicity or needs to be modified to be hydrophobic.

In common aerogels, hydrophobicity or the degree of hydrophobicity may be identified as the content of carbon included in a hydrophobic aerogel. Accordingly, the aerogel capable of being used in preparing the aerogel-containing composition according to one embodiment of the present disclosure may have carbon content of 9% by weight or greater, more specifically 10% by weight or greater and even more specifically 12% by weight or greater with respect to the total weight of the aerogel. In the present disclosure, the carbon content may be measured using a carbon analyzer.

The surface hydrophobization for the aerogel may be carried out using common methods, and specifically, may be carried out using any one of surface modifiers such as silane-based compounds (for example, dimethyl dimethoxysilane, dimethyl diethoxysilane, methyl trimethoxysilane, vinyl trimethoxysilane, phenyl trimethoxysilane, tetraethoxysilane, dimethyl dichlorosilane, 3-aminopropyl triethoxysilane or the like), siloxane-based compounds (for example, polydimethylsiloxane, polydiethylsiloxane, octamethylcyclotetrasiloxane or the like), silanol-based compounds (for example, trimethylsilanol, triethylsilanol, triphenylsilanol, t-butyldimethylsilanol or the like), or silazane-based compounds (for example, 1,1,3,3-tetramethyl disilazane, hexamethyldisilazane, 1,1,2,2-tetraethyldisilazane, 1,2-diisopropyldisilazane or the like), or a mixture of two or more thereof. Accordingly, the aerogel capable of being used in the present disclosure may be a hydrophobic silica aerogel, and more specifically, may be a hydrophobic silica aerogel having carbon content of 9% by weight or greater, more specifically 10% by weight or greater and even more specifically 12% by weight.

Such an aerogel may be included in 1% by weight to 10% by weight with respect to the total weight of the aerogel-containing composition. When the aerogel content in the aerogel-containing composition is excessively low of less than 1% by weight, an insulation property is low when preparing an insulation blanket, and the process may be complicated such as repeatedly coating the aerogel-containing composition for securing a certain insulation property. The aerogel content being greater than 10% by weight may cause concern of workability decline and manufacturing cost increase due to an increase of unattached aerogel particles when preparing an insulation blanket.

ii) Water-Soluble Binder

The water-soluble binder capable of being used in the aerogel-containing composition according to one embodiment of the present disclosure enhances adhesion between aerogel particles and adhesion between aerogel particles and a substrate for a blanket when preparing a blanket thereafter, and therefore, performs a role of preventing aerogel particle detachment in a drying process. In addition, the water-soluble binder hardly produces harmful substances, and causes no concern for workers and working environments. Meanwhile, water-soluble in the present disclosure means a property of being dissolved in water, a polar solvent. Specifically, the water-soluble binder in the present disclosure may be a compound having solubility for water (20±5° C.) of 0.01 g/100 g of water or greater and more specifically 0.01 g/100 g of water to 100 g/100 g of water.

Specific examples of the water-soluble binder may include polyvinyl acetate (PVA), polyacrylic acid, polyacrylic ester, polyethylene vinyl acetate, styrene acrylic ester resins, styrene butadiene resins, polyvinyl alcohol, polyurethane, cellulose-based resins, starch or copolymers thereof, and any one or a mixture of two or more thereof may be used. More specifically, the water-soluble binder may be polyvinyl acetate, polyacrylic acid or a mixture thereof, and more specifically, may be polyvinyl acetate. When necessary, the water-soluble binder may be used together with a crosslinking agent.

The water-soluble binder may be included in 0.1% by weight to 1% by weight with respect to the total weight of the aerogel-containing composition. When the water-soluble binder content is less than 0.1% by weight, aerogel detachment may increase during a drying process since sufficient adhesion is difficult to be provided, and when the content is greater than 1% by weight, the aerogel content relatively decreases causing concern of thermal conductivity increase. When considering a balance between adhesion obtained from the use and the content of the water-soluble binder and an effect of thermal conductivity improvement, the water-soluble binder may be more specifically included in 0.1% by weight to 0.5% by weight with respect to the total weight of the aerogel-containing composition.

iii) Foaming Agent

In the aerogel-containing composition according to one embodiment of the present disclosure, the foaming agent performs a role of suppressing substrate textile shrinkage when preparing a blanket. Specifically, the foaming agent may be an organic foaming agent such as a saturated hydrocarbon-based compound having 1 to 8 carbon atoms (for example, a linear or branched saturated aliphatic hydrocarbon-based compound having 1 to 8 carbon atoms such as n-pentane, isopentane or hexane; a saturated alicyclic hydrocarbon-based compound having 3 to 8 carbon atoms such as cyclopentane or cyclohexane, or the like) or a halide thereof (for example, hexafluorobutane, tetrafluoroethane, heptafluoropropane or the like), and any one or a mixture of two or more thereof may be used. Among these, the foaming agent may be a saturated alicyclic hydrocarbon-based compound having 4 to 6 carbon atoms, and more specifically cyclopentane, cyclohexane or a mixture thereof.

When using existing inorganic foaming agents, $CO_2$ and $H_2O$ gases are produced, and the produced $CO_2$ causes environmental problems such as ozone layer depletion and global warming. The foaming agent capable of being used in the present disclosure is an organic foaming agent and has an ozone layer depletion index of 0, and causes no concern of environmental problems.

The foaming agent may be included in 1% by weight to 10% by weight with respect to the total weight of the aerogel-containing composition. When the foaming agent content is less than 1% by weight, an effect of suppressing substrate textile shrinkage obtained from the use of the foaming agent is insignificant, and when the content is greater than 10% by weight, aerogel particle detachment is excessive causing concern of thermal conductivity increase. When considering significance of improvement effects obtained from the use of the foaming agent, and a balance between the effect of substrate textile shrinkage suppression and thermal conductivity, the foaming agent may be more specifically included in 1% by weight to 5% by weight with respect to the total weight of the aerogel-containing composition.

iv) Solvent

The solvent capable of being used in the aerogel-containing composition according to one embodiment of the present disclosure may specifically be a mixed solvent including water and a polar organic solvent.

Figure 1:
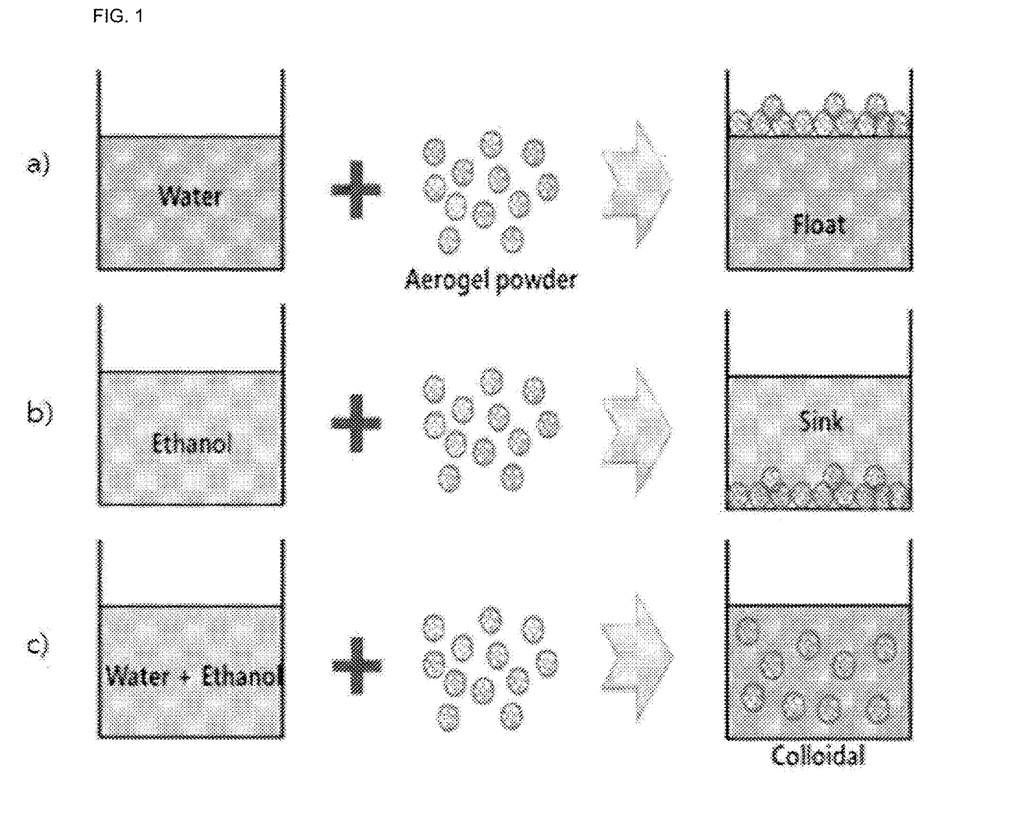
FIG. 1 is a mimetic diagram schematically showing dispersion mechanism of aerogel powder for various solvents.

FIG. 1 is a mimetic diagram schematically showing dispersion mechanism of aerogel powder. However, FIG. 1 is just one example for describing the present disclosure, and the present disclosure is not limited thereto.

As shown in FIG. 1, common aerogels readily float due to low dispersibility for water (a)), and readily precipitate in polar organic solvents such as ethanol (b)). Accordingly, when mixing water and a polar organic solvent, an aerogel may be uniformly dispersed in the mixed solvent since the polar organic solvent has excellent miscibility with the aerogel (c)). In addition, the binder used in the preparation of the aerogel-containing composition according to one embodiment of the present disclosure is water-soluble, and therefore, is readily dissolved in water, but is not soluble in polar organic solvents such as ethanol alone. By using a mixed solvent of water and a polar organic solvent as above, dispersibility of the aerogel is enhanced while readily dissolving the water-soluble binder.

The polar organic solvent may be an alcohol-based solvent, and more specifically, a primary alcohol such as methanol, ethanol, isopropanol or butanol; or a polyalcohol such as glycerol, ethylene glycol, propylene glycol, diethylene glycol, dipropylene glycol and sorbitol, and any one or a mixture of two or more thereof may be used. When considering miscibility with water and the aerogel, the polar organic solvent may be a primary alcohol-based solvent having 1 to 6 carbon atoms such as methanol, ethanol, isopropanol or butanol among these.

The solvent may include the water and the polar organic solvent in a weight ratio of 70:30 to 10:90. In addition, when considering the significance of an effect of enhancing dispersibility of the aerogel obtained from the mixing of water and a hydrophilic polar organic solvent, the solvent may include the water and the polar organic solvent in a weight ratio of 60:40 to 20:80, more specifically 50:50 to 20:80 and even more specifically 30:70 to 20:80.

In addition, such a solvent may be included in 85% by weight to 96% by weight with respect to the total weight of the aerogel-containing composition. When the solvent content is excessively low in the composition outside the above-mentioned range, specifically, is less than 85% by weight, dispersibility of the aerogel decreases, and when preparing a blanket thereafter, coating or immersion for a substrate textile may decline. When the solvent content is greater than 96% by weight, the solvent removing process becomes longer and complicated causing concern of processibility decline.

When considering the significance of improvement effects obtained from controlling the content of the components, the aerogel-containing composition according to one embodiment of the present disclosure may specifically include the aerogel in 1 part by weight to 10 parts by weight, the water-soluble binder in 0.1 part by weight to 1 part by weight, the foaming agent in 1 part by weight to 10 parts by weight and the solvent in 80 parts by weight to 120 parts by weight, and more specifically, when satisfying a relative content condition between each of the components together with the content range of each of the components within the range satisfying the above-mentioned content condition of each of the components, effects of improving thermal conductivity and low density flexibility for a prepared blanket may be more superior.

In addition, the aerogel-containing composition according to one embodiment of the present disclosure may include the water-soluble binder in 1 part by weight to 100 parts by weight, the foaming agent in 10 parts by weight to 1000 parts by weight and the solvent in 800 parts by weight to 10000 parts by weight with respect to 100 parts by weight of the aerogel, and more specifically, may include the water-soluble binder in 1 part by weight to 20 parts by weight, the foaming agent in 20 parts by weight to 500 parts by weight and the solvent in 1000 parts by weight to 3000 parts by weight with respect to 100 parts by weight of the aerogel. When satisfying a relative content condition between each of the components as above, effects of improving thermal conductivity and low density flexibility for a prepared blanket may be more superior.

Meanwhile, the aerogel-containing composition according to one embodiment of the present disclosure may further include one or more types of common additives, specifically, a flame retardant, a silane coupling agent, a water repellent, a curing agent or the like, in addition to the above-mentioned components.

Specifically, the flame retardant is a material suppressing or mitigating combustion by improving organic materials having a readily combustible property using physical and chemical methods, and may specifically include bromine-based, phosphorous-based, aluminum hydroxide-based, antimony-based, magnesium hydroxide-based flame retardants or the like, and any one or a mixture of two or more thereof may be used. The flame retardant may be included in 10% by weight or less or in 0.5% by weight to 5% by weight with respect to the total weight of the aerogel-containing composition.

The silane coupling agent performs a role of enhancing adhesion and long-term stability of the aerogel-containing composition, and those commonly used in aerogel-containing compositions may be used without particular limit. In addition, the silane coupling agent may be included in 10% by weight or less or in 0.1% by weight to 3% by weight with respect to the total weight of the aerogel-containing composition.

The water repellent performs a role of enhancing heat resistance and tolerance while providing a water repelling property for the aerogel-containing composition, and, when preparing a blanket thereafter, enhancing function and lifespan of the blank. The water repellent may specifically be polytetrafluoroethylene or the like, and may be included in 10% by weight or less or in 3% by weight to 5% by weight with respect to the total weight of the aerogel-containing composition.

The curing agent performs a role of increasing an overall crosslinking ability by providing a crosslinking property to the aerogel, and specifically, may be a water-soluble urea resin, a water-soluble melamine resin, a water-soluble alkyd resin and the like, and any one or a mixture of two or more thereof may be used. The curing agent may be included in 10% by weight or less or in 1% by weight to 5% by weight with respect to the total weight of the aerogel-containing composition.

The aerogel-containing composition having such a composition may be prepared by adding the aerogel, the water-soluble binder and the foaming agent in the solvent and mixing the result. More specifically, the composition may be prepared by dissolving the water-soluble binder in the solvent including water and a polar organic solvent, adding the foaming agent thereto, mixing the result, and adding the aerogel to the obtained mixture and mixing the result. When constituents forming the aerogel-containing composition are added in consecutive order and mixed as described above, uniform dispersion of the aerogel in the finally prepared composition may be further enhanced.

When considering the significance of improvement effects obtained from the optimized constitution and simultaneous control of the content, the aerogel-containing composition according to another embodiment of the present disclosure may more specifically include the aerogel in 1% by weight to 10% by weight, the water-soluble binder in 0.1% by weight to 1% by weight, the foaming agent in 1% by weight to 10% by weight and the solvent in 85% by weight to 96% by weight with respect to the total weight of the composition, wherein the aerogel includes a silica aerogel, the water-soluble binder includes polyvinyl acetate, the foaming agent includes a saturated alicyclic hydrocarbon-based mixture having 4 to 6 carbon atoms, and the solvent includes water and a primary alcohol-based solvent having 1 to 6 carbon atoms in a weight ratio of 60:40 to 20:80.

Another embodiment of the present disclosure provides an insulation blanket prepared using the aerogel-containing composition.

The insulation blanket may be prepared using common methods except that the aerogel-containing composition is used.

Specifically, the insulation blanket may be prepared by coating the aerogel-containing composition on at least one surface of a substrate for a blanket or immersing the substrate for a blanket into the composition, and drying the result. Herein, the coating process may be carried out using common slurry coating methods, specifically, methods of bar coating, spin coating, spraying or immersion. In addition, after the drying process, a compressing process for controlling the thickness and making the inside structure and the surface form of the blanket uniform, a forming process for having a proper form or morphology depending on the use, a laminating process laminating a separate functional layer, or the like, may be further carried out.

Accordingly, the prepared insulation blanket may specifically include a substrate for a blanket, an aerogel disposed on at least one surface of the substrate for a blanket, and may further include an aerogel included in the substrate for a blanket.

Specifically, the aerogel may be included in the aerogel-containing composition in an amount of 10% by weight to 80% by weight with respect to the total weight of the insulation blanket. An insulation property is enhanced as the aerogel content increases in the insulation blanket, however, the aerogel content being greater than 80% by weight may cause concern of workability decline and manufacturing cost increase due to a flexibility decrease in the insulation blanket and an increase of the unattached aerogel particles. When the aerogel content in the composition is excessively low, specifically, less than 10% by weight, an insulation property may decline. More specifically, the aerogel may be included in the aerogel-containing composition in an amount of 20% by weight to 80% by weight with respect to the total weight of the insulation blanket.

As the substrate for a blanket in the insulation blanket, substrates of various materials may be used depending on the use of the insulation blanket. Specifically, the substrate for a blanket may be a film, a sheet, a net, a textile, a porous body, a foam, a non-woven fabric or a laminate of two or more layers thereof. In addition, depending on the use, the surface may have surface roughness formed thereon or may be patterned. More specifically, the substrate for a blanket may be a textile capable of more enhancing insulation efficiency by including space or pores readily allowing insertion of the aerogel.

In addition, the substrate for a blanket may have low thermal conductivity, specifically, low thermal conductivity of 10 W/mk or less or 5 W/mk or less when considering the use of the insulation blanket.

Specifically, the substrate for a blanket may be polyamide, polybenzimidazole, polyaramide, an acrylic resin, a phenol resin, polyester, polyetheretherketone (PEEK), polyolefin (for example, polyethylene, polypropylene, a copolymer thereof, or the like), cellulose, carbon, cotton, wool, hemp, non-woven fabric, glass fiber, ceramic wool or the like, but is not limited thereto. More specifically, the substrate may include glass fiber or polyethylene.

In addition, the substrate for a blanket may be hydrophobized. Hydrophobization of the substrate for a blanket may be carried out using common methods, specifically, may be carried out by surface treating the substrate for a blanket using compounds including a hydrophobic functional group such as a linear aliphatic hydrocarbon group (alkyl group having 1 to 20 carbon atoms, alkylene group having 2 to 20 carbon atoms or the like), an aromatic hydrocarbon group (aryl group having 6 to 20 carbon atoms), an organosilicon compound or a combination group thereof, unsubstituted or substituted with halogen and more specifically, a halogenated alkyl group, a silyl group, an aminosilyl group, an alkyl group, a vinyl group, an allyl group, aryl group, an arylalkyl group or an alkylaryl group.

More specifically, the compound for hydrophobization may be a silane-based or siloxane-based compound including the hydrophobic functional group. More specifically, hexamethyldisilazane (HMDS), trimethylchlorosilane (TMSCL), silicone oil, aminosilane, alkylsilane, polydimethylsiloxane, dimethyldichlorosilane (DDS) or the like may be included, and any one or a mixture of two or more thereof may be used.

The surface treatment method is not particularly limited, and hydrophobic materials may be coated on the surface of a carbon coating layer using a chemical vapor deposition (CVD) method or a physical vapor deposition (PVD) method. Such a chemical vapor deposition method may include a fluidized bed chemical vapor deposition method, a rotary powder bed chemical vapor deposition method, a vibration chemical vapor deposition method and the like, and the physical vapor deposition method may include sputtering, a successive vacuum method, a plasma coating method and the like. As a result of such hydrophobization, a hydrophobic functional group is present on the surface of the substrate for a blanket, and as a result, adhesion with the aerogel may be further enhanced.

The substrate for a blanket preferably has low density, and specifically, when the substrate is a textile, fibers forming the textile may have an average fiber diameter of 20 μm to 30 μm.

In addition, the insulation blanket may further include functional layers such as a heat reflecting layer for enhancing insulation efficiency or a surface protective layer capable of enhancing a lifespan property through surface protection on at least one surface of the insulation blanket.

As one example, the heat reflecting layer includes compounds capable of reflecting or blocking infrared radiation, and specifically, may include carbon black, carbon fiber, titanium dioxide, metals (aluminum, stainless steel, copper/zinc alloys, copper/chromium alloys or the like), non-metals, fibers, pigments and the like. The surface protective layer may include high heat resistance waterproof and breathable materials such as polytetrafluoroethylene.

Lamination of the functional layers may be carried out by directly forming the functional layers on at least one surface of the insulation blanket, or placing the functional layers and laminating the result. The lamination process may be carried out using common methods such as heat treatment or hot rolling treatment.

The blanket as above has flexibility of low density together with low thermal conductivity by being prepared using a composition including an aerogel uniformly dispersed in the composition. Specifically, the blanket may have low density of 0.15 g/cm$^3$ or less and more specifically 0.1 g/cm$^3$ to 0.15 g/cm$^3$, and low thermal conductivity of 30 mW/mK or less, more specifically 27 mW/mK or less and even more specifically 18 mW/mK to 27 mW/mK.

Accordingly, the blanket is useful as an incombustible material and an insulation material in aircrafts, vessels, automobiles, construction structures and the like as well as in plant facilities for heating and cooling such as pipes for various industrial equipment or industrial furnaces.

Hereinafter, the present disclosure will be described in more detail with reference to the following examples and test examples. However, the following examples and test examples are for illustrative purposes only, and the scope of the present disclosure is not limited to these examples and test examples.

EXAMPLE 1

A PVA-containing solution was prepared by adding and dissolving polyvinyl acetate (PVA) in water as a water-soluble binder. In a 500 ml round bottom flask, the PVA-containing solution and ethanol were added and mixed so that the weight ratio of the water included in the PVA-containing solution, and the ethanol became 20:80, and the mixture was first mixed. To the resultant first mixed solution, cyclopentane was added as a foaming agent, and the mixture was second mixed. To the resultant second mixed solution, a hydrophobic silica aerogel (porosity: 95% by volume, tap density: 0.2 g/cm$^3$, specific surface area: 700 m$^2$/g, average particle diameter ($D_{50}$): 20 μm, thermal conductivity: 0.02 W/mK, carbon content: 10% by weight) was added, and the result was sufficiently stirred to prepare an aerogel-containing composition. When preparing the aerogel-containing composition, the hydrophobic silica aerogel was used in 5 parts by weight, the PVA was used in 0.125 parts by weight, the cyclopentane was used in 2 parts by weight, and the mixed solvent of water and ethanol was used in 100 parts by weight.

To the aerogel-containing composition prepared above, a polyethylene (PE) fiber hydrophobized with hexamethyldisilazane (HMDS) was immersed for 10 minutes, taken out, and dried for 2 hours at a temperature of approximately 60° C. to prepare an insulation blanket.

EXAMPLE 2

An insulation blanket was prepared in the same manner as in Example 1, except that the cyclopentane, a foaming agent, was used in 10 parts by weight.

EXAMPLE 3

An insulation blanket was prepared in the same manner as in Example 1, except that the weight ratio of the water and the ethanol was changed to 30:70.

EXAMPLE 4

An insulation blanket was prepared in the same manner as in Example 3, except that the cyclopentane was used in 10 parts by weight.

EXAMPLE 5

An insulation blanket was prepared in the same manner as in Example 1, except that the cyclopentane was used in 6 parts by weight.

EXAMPLE 6

An insulation blanket was prepared in the same manner as in Example 1, except that the cyclopentane was used in 8 parts by weight.

EXAMPLE 7

An insulation blanket was prepared in the same manner as in Example 1, except that the cyclopentane was used in 4 parts by weight.

EXAMPLE 8

An insulation blanket was prepared in the same manner as in Example 1, except that the weight ratio of the water and the ethanol was changed to 60:40.

COMPARATIVE EXAMPLE 1

A PVA-containing solution was prepared by adding and dissolving polyvinyl acetate (PVA) in water as a water-soluble binder. In a 500 ml round bottom flask, the PVA-containing solution was introduced, and cyclopentane was added and mixed thereto as a foaming agent. To the resultant mixed solution, a hydrophobic silica aerogel (porosity: 95% by volume, tap density: 0.2 g/cm$^3$, specific surface area: 700 m$^2$/g, average particle diameter ($D_{50}$): 20 μm, thermal conductivity: 0.02 W/mK, carbon content: 10% by weight) was added, and the result was sufficiently stirred to prepare a hydrophobic silica aerogel-containing composition. When preparing the aerogel-containing composition, the hydrophobic silica aerogel was used in 5 parts by weight, the PVA was used in 0.125 parts by weight, the cyclopentane was used in 10 parts by weight, and the water was used in 100 parts by weight.

An insulation blanket was prepared in the same manner as in Example 1 except that the silica aerogel-containing composition prepared above was used.

COMPARATIVE EXAMPLE 2

A PVA-containing solution was prepared by adding and dissolving polyvinyl acetate (PVA) in ethanol as a water-soluble binder. In a 500 ml round bottom flask, the PVA-containing solution was introduced, and cyclopentane was added and mixed thereto as a foaming agent. To the resultant mixed solution, a hydrophobic silica aerogel (porosity: 95% by volume, tap density: 0.2 g/cm$^3$, specific surface area: 700 m$^2$/g, average particle diameter ($D_{50}$): 20 μm, thermal conductivity: 0.02 W/mK, carbon content: 10% by weight) was added, and the result was sufficiently stirred to prepare a hydrophobic silica aerogel-containing composition. When preparing the aerogel-containing composition, the hydrophobic silica aerogel was used in 5 parts by weight, the PVA was used in 0.125 parts by weight, the cyclopentane was used in 10 parts by weight, and the ethanol was used in 100 parts by weight.

An insulation blanket was prepared in the same manner as in Example 1 except that the hydrophobic silica aerogel-containing composition prepared above was used.

COMPARATIVE EXAMPLE 3

A PVA-containing solution was prepared by adding and dissolving polyvinyl acetate (PVA) in water as a water-soluble binder. In a 500 ml round bottom flask, the PVA-containing solution and ethanol were added and mixed so that the weight ratio of the water included in the PVA-containing solution, and ethanol became 20:80. To the resultant mixed solution, a hydrophobic silica aerogel (porosity: 95% by volume, tap density: 0.2 g/cm$^3$, specific surface area: 700 m$^2$/g, average particle diameter ($D_{50}$): 20 μm, thermal conductivity: 0.02 W/mK, carbon content: 10% by weight) was added, and the result was sufficiently stirred to prepare a silica aerogel-containing composition. When preparing the silica aerogel-containing composition, the hydrophobic silica aerogel was used in 5 parts by weight, the PVA was used in 0.125 parts by weight, and the mixed solvent of water and ethanol was used in 100 parts by weight.

An insulation blanket was prepared in the same manner as in Example 1 except that the hydrophobic silica aerogel-containing composition prepared above was used.

Test Example 1

Figure 2:
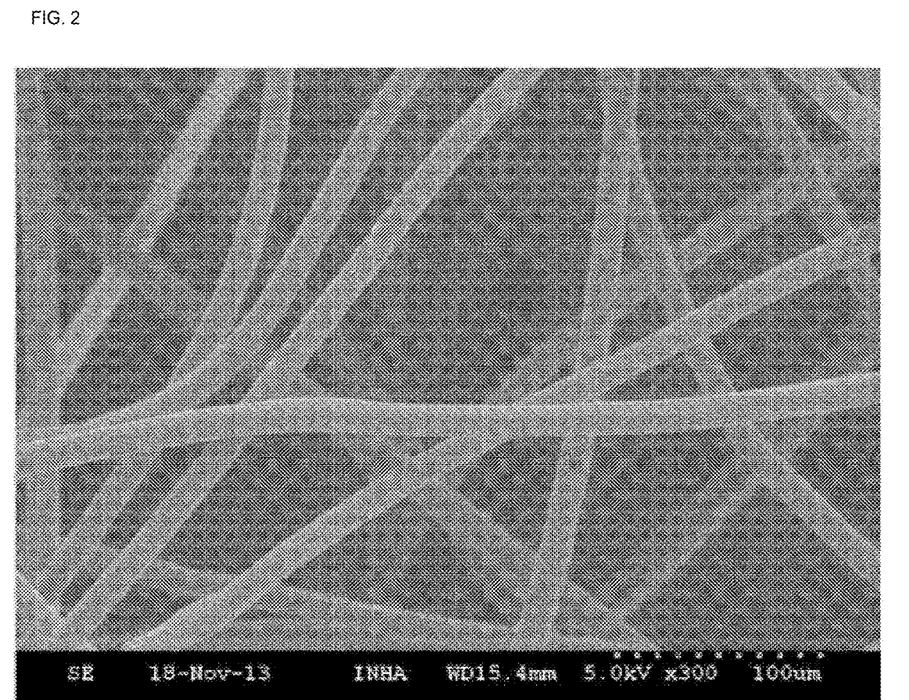
FIG. 2 is a scanning electron microscope picture observing a substrate textile surface used when preparing an insulation blanket in Example 1.
Figure 3:
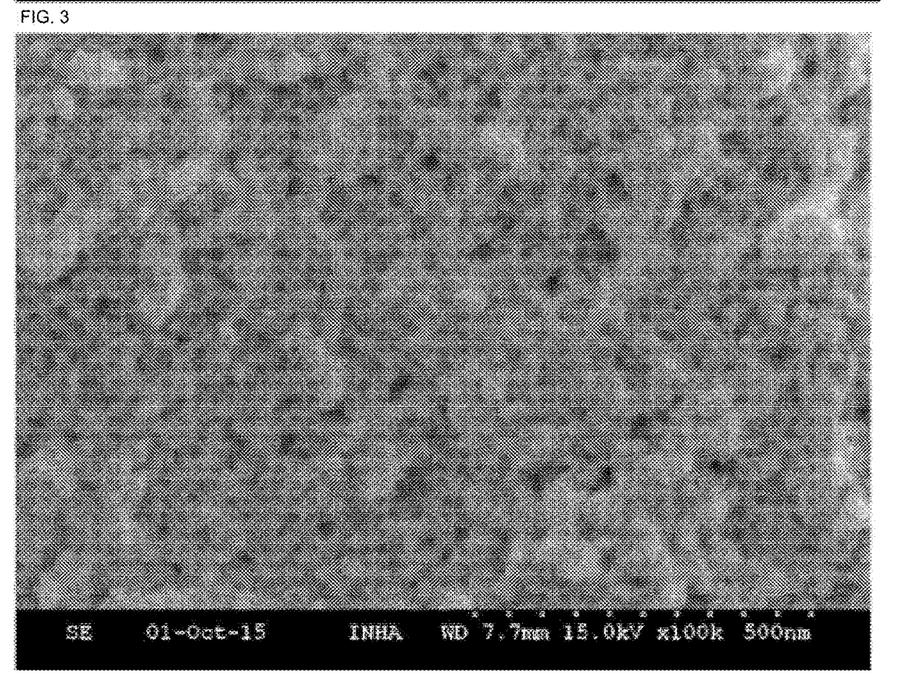
FIG. 3 is a scanning electron microscope picture observing hydrophobic silica aerogel particles used when preparing an insulation blanket in Example 1.
Figure 4:
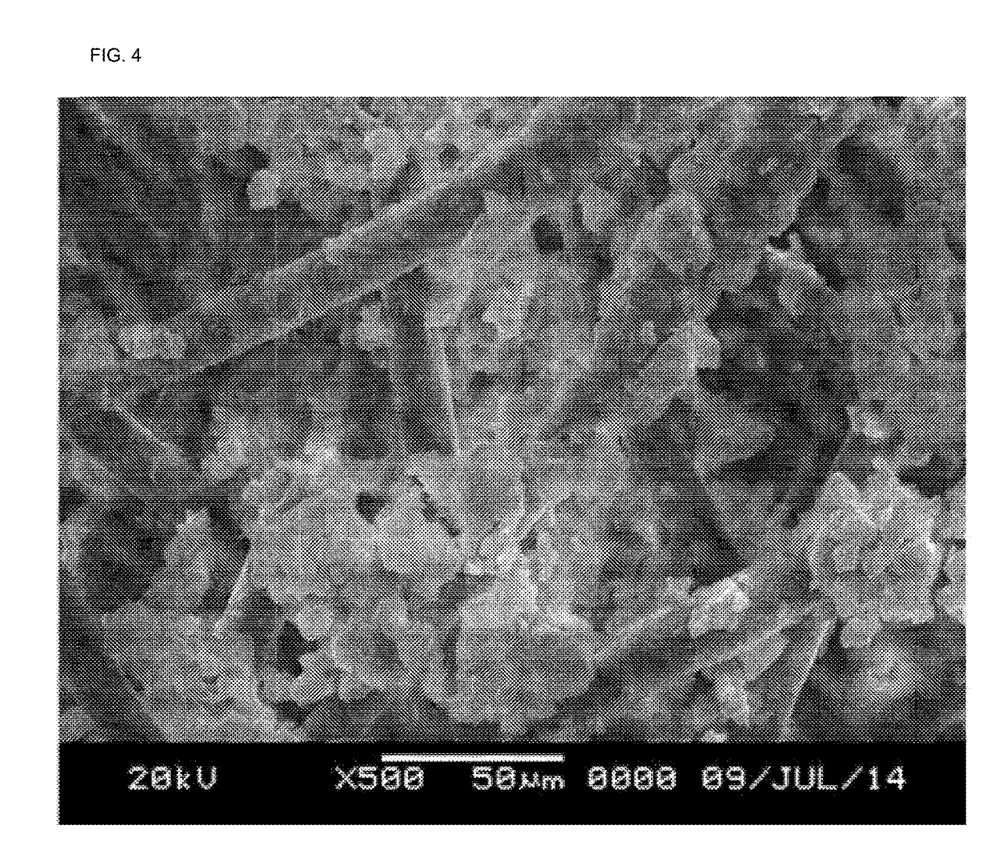
FIG. 4 is a scanning electron microscope picture observing an insulation blanket prepared in Example 1.

The PE fiber and the hydrophobic silica aerogel used in Example 1 were observed, and the results are each shown in FIGS. 2 to 4.

FIG. 2 is a picture observing a surface of the substrate textile used when preparing the insulation blanket in Example 1, FIG. 3 is a picture observing the hydrophobic silica aerogel particles used when preparing the insulation blanket in Example 1, and FIG. 4 is a picture observing the insulation blanket prepared in Example 1 each using a scanning electron microscope.

As shown in FIG. 2, an average diameter of fibers forming the PE textile used when preparing the insulation blanket was 20 μm, and the textile density was 0.022 g/cm³.

As shown in FIG. 3, it was identified that the hydrophobic silica aerogel represented a particulate porous structure including a plurality of micropores between particles, and had a 3-dimensional network structure forming a mesh-type cluster by the bindings of first particles having an average particle diameter ($D_{50}$) of 20 nm.

As shown in FIG. 4, it was identified that the hydrophobic silica aerogel was attached to the surface of the PE fiber in the prepared insulation blanket.

Test Example 2

Dispersibility of the water-soluble binder and the silica aerogel depending on the solvent when preparing the silica aerogel composition according to the present disclosure was evaluated. Herein, polyvinyl acetate was used as the water-soluble binder, and the silica aerogel of Example 1 was used as the silica aerogel. The results are shown in the following Table 1 and FIG. 5.

Figure 5:
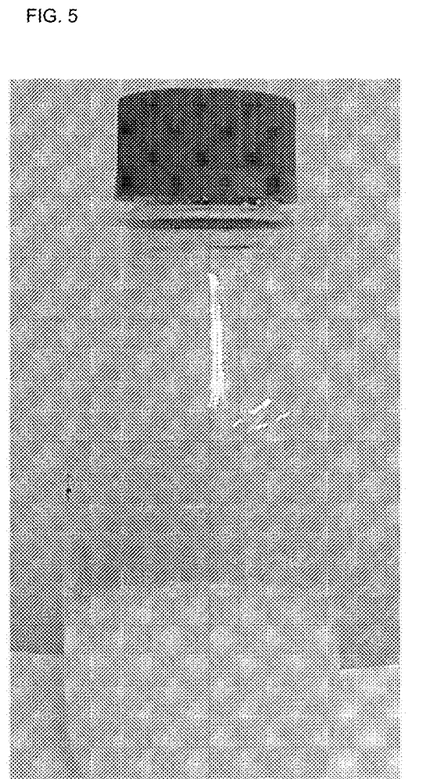
FIG. 5 is a picture observing dispersibility of a silica aerogel for a mixed solvent of water and ethanol in Test Example 2.

FIG. 5 is a picture observing dispersibility of the silica aerogel for a mixed solvent of water and ethanol.

TABLE 1

| Solvent | Polyvinyl Acetate | Silica Aerogel |
|---|---|---|
| Water | Soluble | Floated |
| Ethanol | Non-Soluble | Precipitated |
| Mixed Solvent of Water and Ethanol (6:4 Weight Ratio) | Soluble | Colloidal Dispersed |

Based on the observation results, the polyvinyl acetate water-soluble binder was not soluble in ethanol, but was soluble in water, and the mixed solvent of water and ethanol. In addition, the silica aerogel was floated in water, precipitated in ethanol, whereas uniformly dispersed in a colloidal state in the mixed solvent of water and ethanol.

Test Example 3

In order to evaluate improvement effects in the physical properties of the insulation blanket prepared using the silica aerogel composition according to the present disclosure, thermal conductivity, a degree of detachment and a degree of shrinkage as well as a thickness, density and silica aerogel content were each measured for the blankets prepared in Examples 1 to 7 and Comparative Examples 1 to 3. The results are shown in the following Table 2.

(Thermal Conductivity)

Thermal conductivity was measured under a room temperature (25° C.) condition using a thermal conductivity measuring instrument (HFM436, manufactured by NETZSCH).

(Degree of Detachment)

The degree of detachment of the silica aerogel powder was evaluated in accordance with the following criteria after measuring the amount of silica aerogel powder detached without being attached to the substrate for a blanket after preparing the insulation blanket, and then comparing the content with the amount used when preparing the insulation blanket.

Low: the amount of the detached silica aerogel powder was 10% or less with respect to the total amount of the silica aerogel powder used when preparing the insulation blanket.

Fair: the amount of the detached silica aerogel powder was greater than 10% and less than or equal to 30% with respect to the total amount of the silica aerogel powder used when preparing the insulation blanket.

High: the amount of the detached silica aerogel powder was 30% or greater with respect to the total amount of the silica aerogel powder used when preparing the insulation blanket.

(Degree of Shrinkage)

As for the degree of shrinkage of the substrate textile for an insulation blanket, changes in the polyethylene fiber before and after preparing the insulation blanket were measured, and a thermal shrinkage rate was calculated by the following Mathematical Formula 1.

Thermal Shrinkage Rate (%)=[(Fiber Length before Thermal Shrinkage-Fiber Length after Thermal Shrinkage)/Fiber Length before Thermal Shrinkage]×100        [Mathematical Formula 1]

TABLE 2

| | Thickness (nm) | Density (g/cm³) | Hydrophobic Silica Aerogel Content (% by Weight) | Thermal Conductivity (mW/mk) | Degree of Detachment of Hydrophobic Silica Aerogel Powder | Degree of Shrinkage of Base Textile |
|---|---|---|---|---|---|---|
| Example 1 | 2.529 | 0.136 | 74.6 | 21.19 | Low | 0.75 |
| Example 2 | 3.274 | 0.117 | 77.72 | 26.12 | Fair | 0.67 |
| Example 3 | 2.283 | 0.141 | 73.6 | 23.41 | Low | 0.77 |
| Example 4 | 2.74 | 0.138 | 77.84 | 25.45 | Fair | 0.73 |
| Example 5 | 2.862 | 0.145 | 78.62 | 23.5 | Fair | 0.71 |
| Example 6 | 2.965 | 0.135 | 78.16 | 24.84 | Fair | 0.7 |
| Example 7 | 2.573 | 0.138 | 75.94 | 24.22 | Fair | 0.74 |
| Comparative Example 1 | ND | ND | ND | ND | ND | ND |
| Comparative Example 2 | ND | ND | ND | ND | ND | ND |
| Comparative Example 3 | 1.84 | 0.175 | 73.64 | 31.09 | Low | 0.82 |

In Table 2, ND means not detectable.

As a result of the tests, the insulation blankets of Examples 1 to 7 prepared using the hydrophobic silica aerogel-containing composition according to the present disclosure exhibited significantly low thermal conductivity, degree of powder detachment and degree of substrate textile shrinkage compared to Comparative Example 3 that did not use a foaming agent. In addition, in Comparative Example 1 using water as a single solvent, the water, the aerogel particles and the foaming agent were separated without being mixed to each other, and a hydrophobic silica-containing composition with uniform composition was difficult to be prepared, and immersion to the substrate textile for a blanket was impossible. In Comparative Example 2 using ethanol as a single solvent, PVA, a water-soluble binder, was not dissolved in ethanol, and a hydrophobic silica-containing composition with uniform composition was difficult to be prepared. In addition, in Comparative Example 2, detachment of hydrophobic silica aerogel particles was serious, and property evaluations were not able to be performed.

Test Example 4

For the insulation blankets prepared in Comparative Example 3 and Examples 1 to 6, a shrinkage rate of the blanket depending on the inclusion of a foaming agent was identified. The results are shown in FIG. 6.

Figure 6:
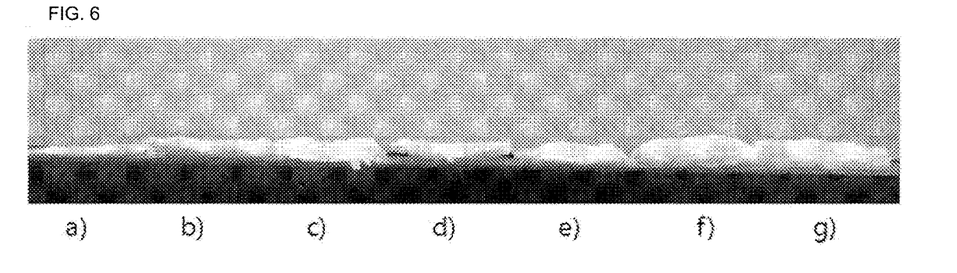
FIG. 6 is a picture observing an effect of controlling a shrinkage rate of a blanket depending on the use of a foaming agent in Test Example 4.

In FIG. 6, a) is the insulation blanket of Comparative Example 3 after carrying out the thermal shrinkage test, and b) to g) are the insulation blankets of Examples 1 to 6, respectively, after carrying out the thermal shrinkage test.

As a result of the observation, the blanket of Comparative Example 3 without using a foaming agent was significantly shrunk compared to the blankets of Examples 1 to 6 using a foaming agent.

What is claimed is:

1. An aerogel-containing composition comprising:
   an aerogel;
   a water-soluble binder;
   a foaming agent; and
   a solvent,
   wherein the solvent includes water and monohydric alcohol-based solvent having 1 to 6 carbon atoms in a weight ratio of 60:40 to 20:80, and
   wherein the water-soluble binder is in an amount of 1 part by weight to 100 parts by weight, the foaming agent is in an amount of 10 parts by weight to 1000 parts by weight, and the solvent is in an amount of 800 parts by weight to 1000 parts by weight, with respect to 100 parts by weight of the aerogel.

2. The aerogel-containing composition of claim 1, wherein the aerogel has porosity of 90% by volume or greater, and tap density of 0.04 $g/cm^3$ to 0.2 $g/cm^3$.

3. The aerogel-containing composition of claim 1, wherein the aerogel has a specific surface area of 700 $m^2/g$ or greater, and wherein the aerogel has a particulate porous structure with an average particle diameter of 5 μm to 80 μm.

4. The aerogel-containing composition of claim 1, wherein the aerogel has thermal conductivity of 0.02 W/mK or less.

5. The aerogel-containing composition of claim 1, wherein the aerogel includes a silica aerogel.

6. The aerogel-containing composition of claim 1, wherein the water-soluble binder includes any one or a mixture of two or more selected from the group consisting of polyvinyl acetate, polyacrylic acid, polyacrylic ester, polyethylene vinyl acetate, styrene acrylic ester resins, styrene butadiene resins, polyvinyl alcohol, polyurethane, cellulose-based resins, starch or copolymers thereof.

7. The aerogel-containing composition of claim 1, wherein the foaming agent includes any one or a mixture of two or more selected from the group consisting of saturated hydrocarbon-based compounds having 1 to 8 carbon atoms and halides thereof.

8. The aerogel-containing composition of claim 1, further comprising any one, two or more additives selected from the group consisting of a flame retardant, a silane coupling agent, a water repellent or a curing agent.

9. An aerogel-containing composition comprising:
   an aerogel in an amount of 1% by weight to 10% by weight;
   a water-soluble binder in an amount of 0.1% by weight to 1% by weight;
   a foaming agent in an amount of 1% by weight to 10% by weight; and
   a solvent in an amount of 85% by weight to 96% by weight, with respect to a total weight of the aerogel-containing composition,
   wherein the aerogel includes a silica aerogel, the water-soluble binder includes polyvinyl acetate, and the foaming agent includes a saturated alicyclic hydrocarbon-based compound having 4 to 6 carbon atoms, and
   wherein the solvent includes water and monohydric alcohol-based solvent having 1 to 6 carbon atoms in a weight ratio of 60:40 to 20:80.

* * * * *